(12) United States Patent
Abukawa

(10) Patent No.: US 6,863,963 B2
(45) Date of Patent: Mar. 8, 2005

(54) SILICON NITRIDE MEMBER, METHOD FOR MANUFACTURING THE SAME, AND CUTTING TOOL

(75) Inventor: Kohei Abukawa, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/821,020

(22) Filed: Mar. 30, 2001

(65) Prior Publication Data

US 2001/0041274 A1 Nov. 15, 2001

(30) Foreign Application Priority Data

| Mar. 31, 2000 | (JP) | 2000-097741 |
| Jan. 22, 2001 | (JP) | 2001-013260 |
| Mar. 7, 2001 | (JP) | 2001-063490 |

(51) Int. Cl.$^7$ ............................................. C22C 29/00
(52) U.S. Cl. ..................... 428/212; 428/697; 428/298; 428/699; 428/701; 427/419.1; 427/419.2; 427/419.7; 501/97.1
(58) Field of Search ................................ 428/698, 697, 428/699, 701, 212; 501/97.1; 427/419.1, 419.2, 419.7; 128/698

(56) References Cited

U.S. PATENT DOCUMENTS

| 4,745,022 | A | * | 5/1988 | Miyake et al. |
| 4,870,036 | A | * | 9/1989 | Yeh |
| 5,114,889 | A | * | 5/1992 | Osamura et al. |
| 5,118,644 | A | * | 6/1992 | Watanabe et al. |
| 5,137,398 | A | * | 8/1992 | Omori et al. |
| 5,234,642 | A | * | 8/1993 | Nishioka et al. |
| 5,296,008 | A | * | 3/1994 | Moriguchi et al. |
| 5,316,856 | A | * | 5/1994 | Suzki et al. |
| 5,318,836 | A | * | 6/1994 | Ito et al. |
| 5,334,453 | A | * | 8/1994 | Iio et al. |
| 5,384,292 | A | * | 1/1995 | Matsui et al. |
| 5,556,815 | A | * | 9/1996 | Boberski et al. |
| 5,622,905 | A | * | 4/1997 | Matsuura et al. |
| 5,767,026 | A | * | 6/1998 | Kondoh et al. |
| 5,908,797 | A | * | 6/1999 | Urashima et al. |
| 5,990,026 | A | * | 11/1999 | Baek et al. |
| 5,998,319 | A | * | 12/1999 | Hintermayer |
| 6,187,706 | B1 | * | 2/2001 | Okabe et al. |

FOREIGN PATENT DOCUMENTS

| EP | 503822 | * | 9/1992 |
| EP | 545382 | * | 6/1993 |
| EP | 679616 | * | 11/1995 |
| EP | 726237 | * | 8/1996 |
| GB | 2263709 | * | 8/1993 |
| JP | 4-136174 | | 5/1992 |
| JP | 4-202075 | | 7/1992 |
| JP | 06-063804 | * | 3/1994 |
| JP | 06-246511 | * | 9/1994 |
| JP | 8-12471 | | 1/1996 |
| JP | 10-212183 | | 8/1998 |
| WO | 9407811 | * | 4/1994 |

* cited by examiner

Primary Examiner—Archene Turner
(74) Attorney, Agent, or Firm—Sughrue Mion, PLLC

(57) ABSTRACT

A silicon nitride member, a method for manufacturing the silicon nitride member and a cutting tool are disclosed. A cutting tool 1 includes a substrate 3 formed through sintering of a silicon nitride material, and a hard film 5 composed of a plurality of hard-component layers. The cutting tool 1 is characterized in that: when the amount of a grain boundary phase as measured at a central portion (for example, the barycenter) of the substrate 3 is taken as 100% by volume, the amount of the grain boundary phase at a depth of 300 $\mu$m from the surface of the substrate 3 is 50% to 70% by volume; when the strength of the substrate 3 as measured before coating with the hard film 5 is taken as 100%, the hardness as measured after coating with the hard film 5 is 70% to 95%; and a change in weight of the substrate 3 associated with sintering is 1.5% to 3.5% by weight.

13 Claims, 2 Drawing Sheets

Surface of the substrate

Surface of the substrate

Centre portion of the substrate

SILICON NITRIDE MEMBER, METHOD FOR MANUFACTURING THE SAME, AND CUTTING TOOL

BACKGROUND OF THE INVENTION

1. Field of the Invention

The present invention relates to a silicon nitride member including a substrate formed through sintering of a silicon nitride material, and a hard film formed on the surface of the substrate, as well as to a method for manufacturing the same and to a cutting tool.

2. Description of the Related Art

Conventionally, in order to enhance wear resistance of a sintered member, such as a ceramic member, the surface of a substrate of, for example, a sintered silicon nitride member is coated with a hard film composed of hard components, such as TiCN.

Examples of the above-mentioned coating method include a CVD (chemical vapor deposition) process and a PVD (physical vapor deposition) process, in which hard components are deposited on the substrate surface to thereby form a hard film on the same.

When a sintered member coated with a hard film was used as, for example, a cutting tool, the cutting tool (a coated tool) exhibited significantly enhanced wear resistance.

In recent years, applications of a coated tool have been shifting toward heavy cutting, which involves a heavy cutting load. Under the circumstances, even a coated tool has been required to exhibit a certain level of resistance to chipping, in addition to high wear resistance.

According to the CVD process or the PVD process mentioned above, hard components are deposited at high temperature, thus involving the following problems: because of difference in coefficient of thermal expansion between the hard film and the substrate, stress remains in the substrate surface; and high temperature employed during deposition modifies the substrate surface. As a result, the strength of the substrate coated with the hard film is impaired as compared with that of the bare substrate.

SUMMARY OF THE INVENTION

The present invention has been achieved in view of the above problems, and an object of the present invention is to provide a silicon nitride member exhibiting little impairment in strength even when a substrate thereof is coated with a hard film, and exhibiting excellent resistance to chipping and wear resistance, as well as to provide a method for manufacturing the same and to provide a cutting tool.

The present inventors have conducted extensive studies on a silicon nitride member in an attempt to minimize impairment in the strength of a substrate thereof coated with a hard film (a coating film) as compared with that of the bare substrate, and have found the following.

A tensile stress remaining in the substrate surface is the primary cause for impairment in the strength of the substrate of a silicon nitride member (a sintered member) obtained through sintering. In cooling the substrate after coating at high temperature with a hard film, the difference in coefficient of thermal expansion between the hard film (high coefficient of thermal expansion) and the substrate (low coefficient of thermal expansion) causes the residual stress.

In recent years, because of advancement of sintering technology and in order to improve wear resistance, the sintering-aid content of a silicon nitride member tends to be reduced. As a result, the coefficient of thermal expansion of the substrate surface becomes low. When the substrate is coated with popular $Al_2O_3$, TiCN, or the like, which constitute a hard film, the difference in coefficient of thermal expansion between the substrate and the hard film becomes more significant.

Specifically, as the difference in coefficient of thermal expansion between the substrate and the hard film increases, a tensile stress remaining in the substrate surface increases, with a resultant impairment in strength of the substrate coated with the hard film. Thus, an important consideration is to minimize the difference in coefficient of thermal expansion between the substrate and the hard film.

According to a conceivable measure for minimizing the difference in coefficient of thermal expansion between the substrate and the hard film, a silicon nitride member is caused to assume a composition of high sintering-aid content, or a composition of low sintering-aid content, as mentioned above, combined with optimization of sintering conditions, to thereby suppress to the extent possible volatilization of a grain boundary phase (a glass phase of sintering aids formed on the surface of a silicon nitride grain) formed on the substrate surface as schematically shown in FIG. 1 of the accompanying drawings.

However, when the amount of a grain boundary phase is increased through addition of a large amount of sintering aids or through suppression of volatilization of the grain boundary phase, the difference in coefficient of thermal expansion decreases, but wear resistance of the substrate itself is impaired. As a result, even when the substrate is coated with the hard film, sufficient wear resistance cannot be obtained, so that the intended effect of coating cannot be yielded.

Thus, in order to maintain good wear resistance and a certain level of resistance to chipping of a silicon nitride member coated with a hard film, an important consideration is to control volatilization of a grain boundary phase, which is formed on the surface of a substrate during sintering of the substrate, so as to establish an appropriate amount of a grain boundary phase. On the basis of the finding, the present invention has been achieved.

The present invention and its preferred features and aspects will next be described.

(1) The present invention provides a silicon nitride member comprising a substrate formed through sintering of a silicon nitride material, and a hard film formed on a surface of the substrate. The silicon nitride member is characterized in that, when the bending strength of the substrate as measured before the substrate is coated with the hard film is taken as 100%, the bending strength of the silicon nitride member as measured after the substrate is coated with the hard film is 70% to 95%.

According to the present invention, when the bending strength of the substrate as measured before the substrate is coated with the hard film is taken as 100%, the bending strength of the silicon nitride member as measured after the substrate is coated with the hard film is 70% to 95%. That is, the silicon nitride member exhibits a high bending strength of not less than 800 MPa when measured after the substrate is coated with the hard film, as described below in the Examples.

Since the silicon nitride member of the present invention has higher strength as compared with a conventional counterpart, resistance to chipping is excellent. Also, coating with the hard film imparts excellent wear resistance.

Because of excellent wear resistance and resistance to chipping, the silicon nitride member of the present invention favorably serves as a material, e.g., for a cutting tool.

(2) Preferably, a change in weight of the substrate associated with sintering is 1.5% to 3.5% by weight.

When the change in weight of the substrate associated with sintering is less than 1.5% by weight, impairment in the strength is not very great, but, for example, practically desirable wear resistance is not obtained. When the change in weight is in excess of 3.5% by weight, the strength after coating is greatly impaired.

According to a preferred aspect of the present invention, a change in weight of the substrate associated with sintering is 1.5% to 3.5% by weight. Therefore, the silicon nitride member has high strength (thus high resistance to chipping) and high wear resistance, and is thus preferably applicable, for example, to a cutting tool.

Notably, a change in weight of the substrate associated with sintering is called the volatilization rate. Herein, the change in weight (volatilization rate) is expressed as the difference between the weight of a debindered body before sintering and the weight of a primary sintered body divided by the weight of the primary sintered body.

(3) A further aspect of the present invention provides a silicon nitride member comprising a substrate formed through sintering of a silicon nitride material, and a hard film formed on a surface of the substrate. The silicon nitride member is characterized in that, when the amount of a grain boundary phase as measured at a central portion of the substrate is taken as 100% by volume, at least one of the following conditions (1) to (5) is satisfied.

(1) The amount of a grain boundary phase as measured in the vicinity of a depth of 100 $\mu$m from the surface of the substrate is less than 30% by volume;

(2) The amount of a grain boundary phase as measured in the vicinity of a depth of 200 $\mu$m from the surface of the substrate is 30% to 50% by volume;

(3) The amount of a grain boundary phase as measured in the vicinity of a depth of 300 $\mu$m from the surface of the substrate is 50% to 70% by volume;

(4) The amount of a grain boundary phase as measured in the vicinity of a depth of 400 $\mu$m from the surface of the substrate is 70% to 85% by volume; and (5) The amount of a grain boundary phase as measured in the vicinity of a depth of 500 $\mu$m from the surface of the substrate is 85% to 100% by by volume.

According to the present invention, when the amount of a grain boundary phase as measured at a central portion of the substrate is taken as 100% by volume, the amount of a grain boundary phase in a region located in the vicinity of a predetermined depth (i.e., a region located in a surface portion of the substrate) from the surface (so-called sintered skin) of the substrate assumes the above-mentioned value in % by volume. That is, the amount of a grain boundary phase tends to vary continuously when measured up to a depth of approximately 500 $\mu$m.

Accordingly, the thus-configured silicon nitride member has higher strength (thus higher resistance to chipping) and higher wear resistance as compared with a conventional counterpart, and is thus favorably applicable for use, for example, as a cutting tool.

Notably, the amount of a grain boundary phase can be obtained, for example, through image analysis of a scanning electron micrograph (a photograph taken by means of an SEM), as, for example, the area ratio of a grain boundary phase to the entire image.

The central portion of the substrate can be, for example, a region extending radially at a radius of 500 $\mu$m from the barycenter of the substrate (a region in the vicinity of the barycenter), but is preferably the barycenter of the substrate. The vicinity of a predetermined depth $\alpha$ (for example, 300 $\mu$m) from the substrate surface can range from +50 $\mu$m to −50 $\mu$m in the thickness direction with respect to the depth $\alpha$ (for example, 300 $\mu$m) from the substrate surface, but is preferably the depth $\alpha$.

(4) Preferably, as in the case of aspect (2) above, a change in weight of the substrate associated with sintering is 1.5% to 3.5% by weight. Therefore, the silicon nitride member of the present aspect has high strength (thus high resistance to chipping) and high wear resistance, and is thus preferably applicable, for example, as a cutting tool.

(5) A further aspect of the invention provides a method for manufacturing a silicon nitride member described above, which method is characterized in that a condition employed in sintering the substrate is adjusted such that a change in weight of the substrate associated with sintering is 1.5% to 3.5% by weight.

According to this aspect of the present invention, when the substrate made of a silicon nitride material is to be sintered, a sintering condition is adjusted such that a change in weight of the substrate associated with sintering is 1.5% to 3.5% by weight. Thus, when, subsequent to sintering, the substrate surface is coated with a hard film to thereby yield a silicon nitride member, the difference in coefficient of thermal expansion between the substrate and the hard film is small.

Therefore, the thus-obtained silicon nitride member has high strength (thus high resistance to chipping) and high wear resistance, and is thus preferably applicable, for example, as a cutting tool.

Notably, sintering conditions include the maximum temperature during sintering and gas pressure (nitrogen gas pressure) during sintering. For example, through increase in the maximum temperature during sintering, the change in weight can be increased. By contrast, through increase in gas pressure, the change in weight can be decreased.

(6) Preferably, the method according to the present aspect of the invention for manufacturing a silicon nitride member, comprises the steps of: heating the substrate at a temperature of 1800° C. to 1900° C. for 60 to 180 minutes in a nitrogen atmosphere pressurized at 2 to 6 atmospheres; subsequently lowering the temperature to a range of 1550° C. to 1650° C.; and maintaining the substrate at the reduced temperature for 60 to 180 minutes under a reduced pressure not higher than 13 kPa.

A change in weight of the substrate associated with sintering (for example, a state of volatilization as represented by a volatilization rate) cannot be easily controlled. However, through control of the volatilization by means of the method of the present invention, a desired silicon nitride member can be obtained.

According to the present aspect of the invention, the substrate is densified in a pressurized nitrogen atmosphere, and then the temperature is lowered to a temperature at which silicon nitride does not decompose, followed by heat treatment under reduced pressure to thereby appropriately volatilize a grain boundary phase without decomposition of silicon nitride.

According to the present aspect of the invention, the temperature is lowered to a temperature range of 1550° C. to 1650° C. for the following reason. At a temperature lower than 1550° C., the grain boundary phase fails to be sufficiently volatilized. At a temperature higher than 1650° C., silicon nitride decomposes. The substrate is heat-treated at a pressure not higher than 13 kPa, since at a pressure higher than 13 kPa, the grain boundary phase fails to be sufficiently volatilized (regardless of temperature).

Manufacture of the silicon nitride member involves a debindering process, a primary sintering process, and an HIP (hot isostatic press) process. In the present invention, the step for heating the substrate at respective temperatures corresponds to the primary sintering process.

(7) A further aspect of the invention provides a cutting tool formed of a silicon nitride member described in any one of aspects (1) to (4) above.

A cutting tool formed of a silicon nitride member having the above-mentioned properties exhibits excellent wear resistance and resistance to chipping, and is thus favorably applicable not only to normal cutting but also to heavy cutting, which involves a heavy cutting load.

The aforementioned silicon nitride member having excellent wear resistance and resistance to chipping is applicable not only to cutting tools but also, for example, to wear resistant members of automobile engine components and rotary tools, such as drills and end mills.

Examples of the aforementioned silicon nitride material include sialon and a mixture of silicon nitride, such as $\alpha$-$Si_3N_4$, and sintering aids, such as $MgO$, $Al_2O_3$, $Yb_2O_3$, $Y_2O_3$, $ZrO_2$, $Hf_2O_3$ and $Er_2O_3$.

Hard components serving as material for the hard film include $Al_2O_3$, $TiCN$, $TiN$, and $TiC$.

The hard film may assume the form of a single layer of a single hard component or a multilayer of the same hard component or different hard components.

DESCRIPTION OF THE PREFERRED EMBODIMENTS

Embodiments of a silicon nitride member, a method for manufacturing the same, and a cutting tool according to the present invention will next be described. However, the present invention should not be construed as being limited thereto.

a) First, a cutting tool formed of a silicon nitride member according to the present embodiment will be described.

Figure 1:
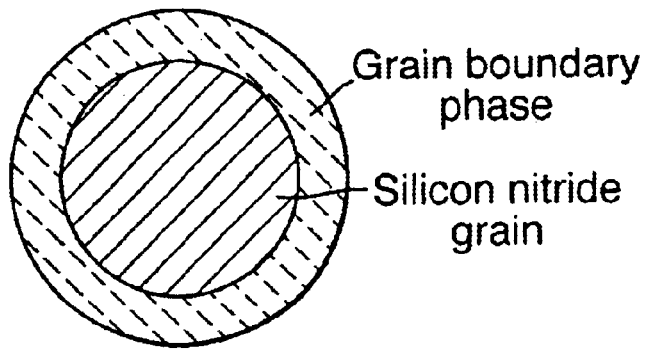
FIG. 1 is a schematic view showing the internal structure of a silicon nitride member.
Figure 2:
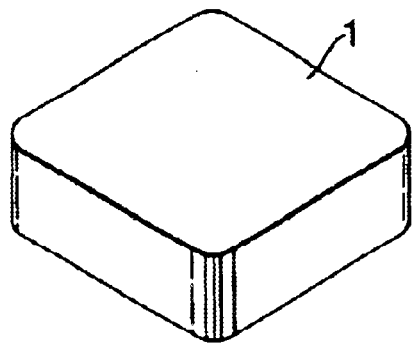
FIG. 2 is a perspective view showing a cutting tool according to an embodiment of the present invention.

As shown in FIG. 2, a cutting tool 1 of the present embodiment is a ceramic insert assuming the SNGN120412 shape prescribed in ISO Standards 1832.2 (1984); i.e., a substantially square plate-like shape.

Figure 3:
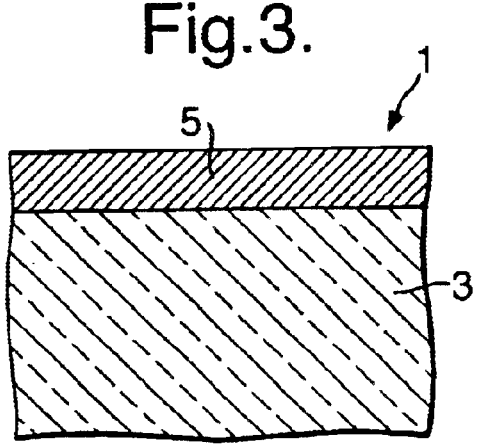
FIG. 3 is a schematic enlarged sectional view of the cutting tool

As shown in FIG. 3, the cutting tool 1 includes a substrate 3 formed through sintering of a silicon nitride material, and a hard film (coating film) 5 composed of a plurality of hard-component layers and having a thickness of 2.0 $\mu$m.

The cutting tool 1 of the present embodiment is characterized in that, when the amount of a grain boundary phase as measured at a central portion of the substrate 3; for example, at the barycenter, is taken as 100% by volume, the amount of the grain boundary phase (% by volume) gradually increases over the range from the surface (sintered skin) of the substrate 3 to a depth of 500 $\mu$m. Specifically, the amount of the grain boundary phase as measured at a depth of 100 $\mu$m from the surface of the substrate 3 is less than 30% by volume; the amount of the grain boundary phase at a depth of 200 $\mu$m is 30% to 50% by volume; the amount of the grain boundary phase at a depth of 300 $\mu$m is 50% to 70% by volume; the amount of the grain boundary phase at a depth of 400 $\mu$m is 70% to 85% by volume; and the amount of the grain boundary phase at a depth of 500 $\mu$m is 85% to 100% by volume.

When the bending strength of the substrate 3 as measured before the substrate 3 is coated with a hard film 5 is taken as 100%, the bending strength of the cutting tool 1 as measured after the substrate 3 is coated with the hard film 5 is 70% to 95%. A change in weight of the substrate 3 associated with sintering is 1.5% to 3.5% by weight.

The above-mentioned features of the present embodiment impart high wear resistance and high strength (thus high resistance to chipping) to the cutting tool 1.

b) Next, a method for manufacturing the cutting tool 1 according to the present embodiment will be described.

First, the following materials are measured out: 97% by weight $\alpha$-$Si_3N_4$, which serves as a main component and has an average grain size not greater than 1.0 $\mu$m; and 0.5% by weight $MgO$, 1.0% by weight $Al_2O_3$, and 1.5% by weight $Yb_2O_3$, which serve as sintering aids and have an average grain size not greater than 1.0 $\mu$m.

The thus-measured materials are placed in a pot lined with $Si_3N_4$ and mixed for 96 hours by use of $Si_3N_4$ balls and an ethanol solvent to thereby yield a slurry.

The thus-obtained slurry is sieved through a 325-mesh sieve. A micro-wax-type organic binder dissolved in ethanol is added to the sieved slurry in an amount of 5.0% by weight, followed by spray drying.

The thus-granulated powder is compacted into the SNGN120412 shape prescribed in ISO Standards 1832.2 (1984). The resulting compact is placed in a heating apparatus and debindered at 600° C. for 60 minutes in a nitrogen atmosphere of 1 atmosphere.

The thus-debindered compact undergoes primary sintering under the following conditions.

The debindered compact is heated at a temperature of 1800° C. to 1900° C. for 60 to 180 minutes in a nitrogen atmosphere pressurized at 2 to 6 atmospheres; subsequently, the temperature is lowered to a range of 1550° C. to 1650° C.; and the debindered compact is maintained at the reduced temperature for 60 to 180 minutes under a reduced pressure not higher than 13 kPa.

In the present embodiment, conditions of the above-mentioned sintering process were adjusted such that the difference between the weight of the debindered compact measured before sintering and the weight of the debindered compact measured after primary sintering (the weight of a primary sintered body) divided by the weight of the primary sintered body falls within range of 1.5% to 3.5% by weight.

In this case, the weight of the debindered compact and the weight of the primary sintered body are measured to thereby obtain a change in weight associated with sintering.

Next, secondary sintering is performed by means of HIP. Specifically, the primary sintered body is heated at a temperature of 1600° C. to 1800° C. for 120 minutes in a nitrogen atmosphere pressurized at 1000 atmospheres, thereby yielding a sintered silicon nitride body.

The thus-obtained sintered silicon nitride body is machined into the SNGN120412 cutting-tool shape (specifically, the shape of the substrate 3 of the cutting tool 1).

Next, the hard film (coating film) 5 composed of hard components is formed on the surface of the substrate 3 by a CVD process.

Specifically, a TiCN layer (0.2 μm thick), an $Al_2O_3$ layer (0.5 μm thick), a TiCN layer (0.2 μm thick), an $Al_2O_3$ layer (0.5 μm thick), a TiC layer (0.2 μm thick), a TiCN layer (0.2 μm thick), and a TiN layer (0.2 μm thick) were formed in that order on the substrate 3, thereby forming the hard film 5 having a thickness of 2.0 μm on the surface of the substrate 3.

Thus, a silicon nitride member composed of the substrate 3 and the hard film 5, which is formed on the surface of the substrate 3; i.e., the cutting tool 1 of the present embodiment was completed.

EXAMPLES

Next will be described experiments conducted in order to confirm the effects of the present invention.

First, samples of Example Nos. 3, 4, 6, 9, and 12 to 14, which fall within the scope of the present invention, were manufactured by the method described previously in the Embodiments section.

The samples assumed the form of a test piece for use in the 3-point bending test prescribed in JIS R1601 (1981) and were manufactured under the heat treatment conditions (conditions of primary sintering) shown below in Table 1. Twenty samples were manufactured for each of the Examples. Of the 20 samples, 10 samples were not coated with a hard film, and 10 other samples were coated with a hard film. Also, for use in a wear resistance test, 10 cutting tool samples were manufactured for each of the Examples by the method described previously in the Embodiments section.

Samples of Comparative Example Nos. 1, 2, 5, 7, 8, 10, 11, and 15 to 17, which fall outside the scope of the present invention, were manufactured.

The samples assumed the form of a test piece for use in the bending test and were manufactured under the heat treatment conditions (conditions of primary sintering) shown below in Table 1. Twenty samples were manufactured for each of the Comparative Examples. Of the 20 samples, 10 samples were not coated with a hard film, and 10 other samples were coated with a hard film. Also, for use in a wear resistance test, 10 cutting tool samples were manufactured for each of the Comparative Examples.

(1) When the samples of the Examples and the Comparative Examples were manufactured, the samples were measured for a change in weight (volatilization rate) associated with primary sintering. The average of measured values was calculated for each of the Examples and the Comparative Examples. The results are shown in Table 2.

(2) Ten samples of each of the Examples and the Comparative Examples were subjected to the 3-point bending test prescribed in JIS R1601. The average of measured values of 10 samples was calculated for each of the Examples and the Comparative Examples, with respect to bending strength before coating with the hard film and bending strength after coating with the hard film. The results are shown in Table 2.

(3) The strength of a sample after coating with the hard film was divided by that before coating with the hard film. The resulting value was expressed as a percentage expressed as the strength ratio. The results are shown in Table 2.

(4) The cutting tools of the Examples and the Comparative Examples were chamfered (0.2 mm×25°) at the nose thereof. Then, the cutting tools were subjected to cutting under the following conditions:

Workpiece material: FC200 (plain cast iron) prescribed in JIS G5501 (1989)

Cutting speed: 100 m/min

Feed rate: 0.1 mm/rev

Depth of cut: 1.0 mm

Cutting time: 60 min

The cutting tools were measured for the amount of flank wear and the amount of notch wear. The results are shown in Table 2.

(5) The microstructures of the cutting tool samples before coating with the hard film were observed in the following manner. The surface of a substrate and the central cut surface of the substrate were polished to mirror finish. The microstructure of the polished surfaces was observed with a scanning electron microscope (SEM).

Figure 4A:
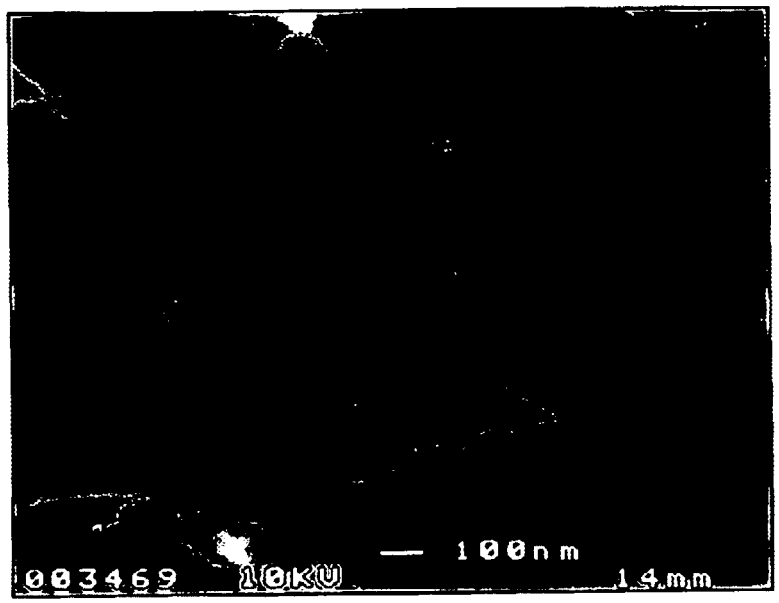
FIG. 4 comprises photographs showing the cutting tool according to the embodiment, wherein (a) is a photograph of a surface of the substrate taken with a scanning electron microscope, and (b) is a photograph of a center portion of the substrate taken with the scanning electron microscope.
Figure 4B:
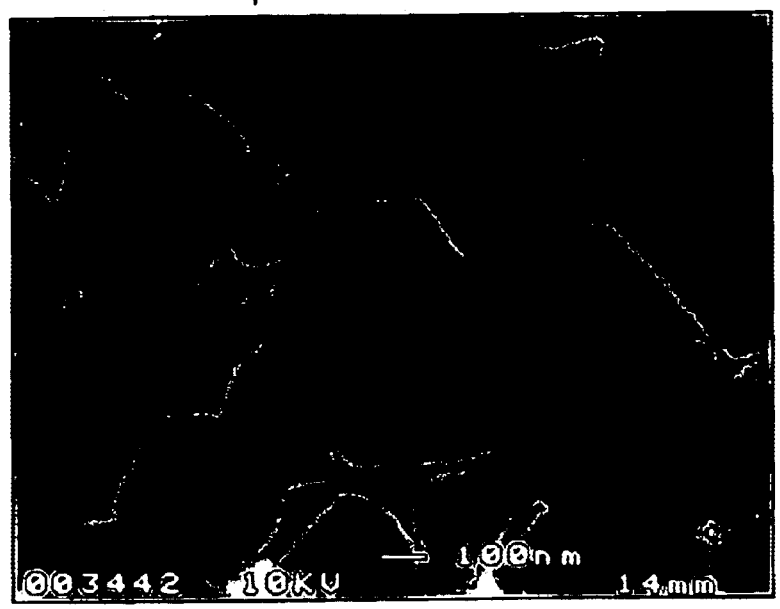

Specifically, a surface of the substrate (a surface obtained through polishing an un-polished sintered body to a depth of 300 μm) was observed with the scanning electron microscope to thereby obtain a (SEM) photograph (magnification: 60000) of the microstructure of the surface (see FIG. 4(a)). Further, a central cut surface (specifically, a cut surface passing through the barycenter) of the substrate was observed with the scanning electron microscope to thereby obtain a photograph (magnification: 60000) of the microstructure of the central cut surface of the substrate (see FIG. 4(b)). Through analysis of the images of these photographs, the amount of the grain boundary phase was measured.

It is to be noted that the "surface of the substrate" refers to a surface of an insert obtained by grinding a sintered body, and in general, refers to a surface obtained by removing, through grinding, a surface portion of the sintered body by an amount of 200 to 300 μm. Through analysis of the image of the SEM photograph of the surface of the substrate, the ratio of a grain boundary phase in a region extending radially at a radius of 1.5 μm from a point located at a depth of 300 μm from the surface of the substrate was obtained for use as the amount of a grain boundary phase of a surface portion of the substrate. Also, through analysis of the image of the SEM photograph of the central cut surface of the substrate, the ratio of a grain boundary phase in a region extending radially at a radius of 1.5 μm from the barycenter of the substrate was obtained for use as the amount of a grain boundary phase of a central portion of the substrate. The amount of a grain boundary phase of a surface portion of the substrate was divided by that of a central portion of the substrate. The resulting value was expressed in percentage as the amount of a grain boundary phase of the substrate surface (the amount of a grain boundary phase at a depth of 300 μm). The results are shown in Table 2.

TABLE 1

| | | Heat Treatment Conditions | | |
| --- | --- | --- | --- | --- |
| | Sample No. | Temp. (° C.) | Time (min) | Pressure (kPa) |
| Comparative Example | 1 | 1500 | 180 | 6.5 |
| | 2 | | 240 | |
| Example | 3 | 1550 | 60 | |
| | 4 | | | 13 |
| Comparative Example | 5 | | | 26 |
| Example | 6 | | 180 | 6.5 |
| Comparative | 7 | | 240 | |
| Example | 8 | 1600 | 30 | |
| Example | 9 | | 120 | |
| Comparative | 10 | | 240 | |

TABLE 1-continued

| | Sample No. | Heat Treatment Conditions | | |
| --- | --- | --- | --- | --- |
| | | Temp. (° C.) | Time (min) | Pressure (kPa) |
| Example | 11 | 1650 | 30 | |
| Example | 12 | | 60 | |
| | 13 | | 180 | |
| | 14 | | | 13 |
| Comparative | 15 | | | 26 |
| Example | 16 | 1700 | 30 | 13 |
| | 17 | | 60 | |

TABLE 2

| | Sample No. | Volatiliza-tion Rate (% by Weight) | Amount of Grain Boundary Phase at Depth 300 μm (% by Volume) | Bending Strength of (MPa) | | | Amount of Flank Wear (mm) | Amount of Boundary Wear (mm) |
| --- | --- | --- | --- | --- | --- | --- | --- | --- |
| | | | | Before Coating | After Coating | Strength Ratio | | |
| Comp. Example | 1 | 1 | 90 | 1295 | 1225 | 94.6 | 0.35 | 0.31 |
| Example | 2 | 1.1 | 89 | 1290 | 1189 | 92.2 | 0.35 | 0.39 |
| Example | 3 | 1.6 | 69 | 1283 | 1210 | 94.3 | 0.20 | 0.20 |
| | 4 | 1.5 | 70 | 1300 | 1235 | 95 | 0.20 | 0.22 |
| Comp. Example | 5 | 1.3 | 80 | 1277 | 1184 | 92.7 | 0.34 | 0.35 |
| Example | 6 | 2.2 | 63 | 1287 | 1158 | 90 | 0.17 | 0.17 |
| Comp. | 7 | 3.7 | 48 | 959 | 532 | 55.5 | 0.12 | 0.11 |
| Example | 8 | 1.3 | 80 | 1288 | 1224 | 95 | 0.33 | 0.35 |
| Example | 9 | 3.1 | 53 | 1244 | 1009 | 81.1 | 0.15 | 0.16 |
| Comp. | 10 | 4 | 40 | 915 | 502 | 54.9 | 0.13 | 0.13 |
| Example | 11 | 1.3 | 81 | 1285 | 1199 | 93.3 | 0.32 | 0.33 |
| Example | 12 | 2.5 | 58 | 1281 | 1136 | 88.7 | 0.17 | 0.18 |
| | 13 | 3.4 | 52 | 1235 | 909 | 73.6 | 0.13 | 0.12 |
| | 14 | 3.5 | 50 | 1223 | 856 | 70 | 0.13 | 0.15 |
| Comp. | 15 | 1.3 | 86 | 1307 | 1191 | 91.1 | 0.33 | 0.4 |
| Example | 16 | 4 | 42 | 901 | 462 | 51.3 | 0.13 | 0.18 |
| | 17 | Decomposition of silicon nitride | | Unable to evaluate | | | | | c) As seen from Tables 1 and 2, the samples of Example Nos. 3, 4, 6, 9 and 12 to 14, which fall within the scope of the present invention, exhibited a volatilization of 1.5% to 3.5% by weight and an amount of grain boundary phase of 50% to 70% by volume as measured at the substrate surface.

As a result, the samples of the Examples exhibited a strength ratio not less than 70, indicating a low impairment in strength after coating with the hard film. The samples also exhibited a small amount of flank wear not greater than 0.2 mm and a small amount of notch wear not greater than 0.22 mm. Thus, the cutting tools of the Examples have excellent resistance to chipping and wear resistance and are thus favorably applicable not only to normal cutting but also, for example, to heavy cutting.

By contrast, the samples of Comparative Example Nos. 1, 2, 5, 8, 11 and 15 respectively exhibited a volatilization rate of 1, 1.1, 1.3, 1.3, 1.3 and 1.3% by weight and an amount of grain boundary phase of 90%, 89%, 80%, 80%, 81% and 86% by volume as measured at the substrate surface, respectively.

As a result, the samples of the Comparative Examples exhibited a high strength ratio of 94.6, 92.2, 92.7, 95, 93.3 and 91.1. However, the samples exhibited a large amount of flank wear of 0.35, 0.35, 0.34, 0.33, 0.32 and 0.33 mm and a large amount of notch wear of 0.31, 0.39, 0.35, 0.35, 0.33 and 0.4 mm. Thus, the cutting tools of the Comparative Examples failed to exhibit sufficiently high resistance to wear.

The samples of Comparative Example Nos. 7, 10, and 16 respectively exhibited a volatilization rate of 3.7, 4 and 4% by weight and an amount of grain boundary phase of 48%, 40% and 42% by volume as measured at the substrate surface.

As a result, the samples of the Comparative Examples exhibited a low strength ratio of 55.5, 54.9 and 51.3, although the samples exhibited a small amount of flank wear of 0.12, 0.13 and 0.13 mm and a small amount of notch wear of 0.11, 0.13 and 0.18 mm. Thus, due to low bending strength, the cutting tools of the Comparative Examples exhibited impaired resistance to chipping.

The samples of Comparative Example No. 17 could not be evaluated, because silicon nitride was decomposed due to high heating temperature.

The present invention is not limited to the above-described embodiments, but may be embodied in various forms without departing from the scope of the present invention.

For example, the present invention is applicable not only to a square plate-like cutting tool but also to a triangular plate-like cutting tool.

As described above, the silicon nitride member of the present invention exhibits merely a slight impairment in strength as measured after coating with the hard film, and thus has high wear resistance and high resistance to chipping.

According to the method for manufacturing a silicon nitride member of the present invention, a silicon nitride member having high wear resistance and high resistance to chipping can be readily manufactured.

A cutting tool formed of the thus-manufactured silicon nitride member can exhibit long life under heavy-load working conditions.

This application is based on Japanese Patent Application No. 2000-97741 filed Mar. 31, 2000, Japanese Patent Application No. 2001-13260 filed Jul. 22, 2001, and Japanese Patent Application No. 2001-63490 filed Mar. 7, 2001, the disclosures of which are incorporated herein by reference in their entirety.

What is claimed is:

1. A silicon nitride member comprising a substrate formed by sintering a silicon nitride material, and a hard film comprising a hard component selected from the group consisting of $Al_2O_3$, TiCN, TiN and TiC formed on a surface of said substrate, said silicon nitride member characterized in that:

when the strength of said substrate measured before said substrate is coated with said hard film is taken as 100%, the strength of said silicon nitride member measured after said substrate is coated with said hard film is 70% to 95%, and when used to cut plain cast iron at a cutting speed of 100 m/min, a feed rate of 0.1 mm/rev, a depth of cut of 1.0 mm and a cutting time of 60 min, the silicon nitride member exhibits flank wear in an amount of not greater than 0.2 mm and notch wear in an amount of not greater than 0.22 mm.

2. The silicon nitride member as claimed in claim 1, wherein a change in weight of said substrate associated with sintering is 1.5% to 3.5% by weight.

3. A cutting tool formed of the silicon nitride member as claimed in claim 1.

4. The silicon nitride member as claimed in claim 1, wherein the hard film consists of a single layer of a single hard component or a multilayer of the same hard component or different hard components.

5. The silicon nitride member as claimed in claim 1, wherein the silicon nitride material contains a sintering aid in an amount of up to 3.0% by weight.

6. A silicon nitride member comprising a substrate formed by sintering of a silicon nitride material, and a hard film comprising a hard component selected from the group consisting of $Al_2O_3$, TiCN, TiN and TiC formed on a surface of said substrate, said silicon nitride member characterized in that:

when the amount of a grain boundary phase as measured at a central portion of said substrate is taken as 100% by volume, at least condition (3) of the following conditions (1) to (3) is satisfied:

(1) the amount of a grain boundary phase as measured in the vicinity of a depth of 100 $\mu$m from the surface of said substrate is less than 30% by volume;

(2) the amount of a grain boundary phase as measured in the vicinity of a depth of 200 $\mu$m from the surface of said substrate is 30% to 50% by volume; and (3) the amount of a grain boundary phase as measured in the vicinity of a depth of 300 $\mu$m from the surface of said substrate is 50% to 70% by volume.

7. The silicon nitride member as claimed in claim 6, wherein a change in weight of said substrate associated with sintering is 1.5% to 3.5% by weight.

8. A cutting tool formed of the silicon nitride member as claimed in claim 6.

9. The silicon nitride member as claimed in claim 6, wherein the hard film consists of a single layer of a single hard component or a multilayer of the same hard component or different hard components.

10. The silicon nitride member as claimed in claim 6, wherein the silicone nitride material contains a sintering aid in an amount of up to 3.0% by weight.

11. A method, for manufacturing a silicon nitride member comprising a substrate formed by sintering a silicon nitride material, and a hard film comprising a hard component selected from the group consisting of $Al_2O_3$, TiCN, TiN and TiC formed on a surface of said substrate, said silicon nitride member characterized in that:

when the strength of said substrate measured before said substrate is coated with said hard film is taken as 100%, the strength of said silicon nitride member measured after said substrate is coated with said hard film is 70% to 95%, and when used to cut plain cast iron at a cutting speed of 100 m/min, a feed rate of 0.1 mm/rev, a depth of cut of 1.0 mm and a cutting time of 60 min, the silicon nitride member exhibits flank wear in an amount of not greater than 0.2 mm and notch wear in an amount of not greater than 0.22 mm, which method comprises:

adjusting a condition employed in sintering said substrate such that a change in weight of the substrate associated with sintering is 1.5% to 3.5% by weight.

12. A method, for manufacturing a silicon nitride member comprising a substrate formed by sintering of a silicon nitride material, and a hard film comprising a hard component selected from the group consisting of $Al_2O_3$, TiCN, TiN and TiC formed on a surface of said substrate, said silicon nitride member characterized in that:

when the amount of a grain boundary phase as measured at a central portion of said substrate is taken as 100% by volume, at least condition (3) of the following conditions (1) to (3) is satisfied:

(1) the amount of a grain boundary phase as measured in the vicinity of a depth of 100 $\mu$m from the surface of said substrate is less than 30% by volume;

(2) the amount of a grain boundary phase as measured in the vicinity of a depth of 200 $\mu$m from the surface of said substrate is 30% to 50% by volume; and (3) the amount of a grain boundary phase as measured in the vicinity of a depth of 300 $\mu$m from the surface of said substrate is 50% to 70% by volume.

adjusting a condition employed in sintering said substrate such that a change in weight of the substrate associated with sintering is 1.5% to 3.5% by weight.

13. The method as claimed in claim 11 for manufacturing a silicon nitride member, comprising the steps of:

heating the substrate at a temperature in a range of from 1800° C. to 1900° C. for 60 to 180 minutes in a nitrogen atmosphere pressurized at from 2 to 6 atmospheres; subsequently lowering the temperature to a range of 1550° C. to 1650° C.; and maintaining the substrate at a reduced temperature for 60 to 180 minutes under a reduced pressure not higher than 13 kPa.

* * * * *